United States Patent
Kambhatla

(10) Patent No.: US 9,398,065 B2
(45) Date of Patent: Jul. 19, 2016

(54) AUDIO/VIDEO STREAMING IN A TOPOLOGY OF DEVICES WITH NATIVE WIGIG SINK

(75) Inventor: Srikanth Kambhatla, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 149 days.

(21) Appl. No.: 13/996,595

(22) PCT Filed: Dec. 17, 2011

(86) PCT No.: PCT/US2011/065684
§ 371 (c)(1),
(2), (4) Date: May 8, 2014

(87) PCT Pub. No.: WO2013/089793
PCT Pub. Date: Jun. 20, 2013

(65) Prior Publication Data
US 2014/0244856 A1    Aug. 28, 2014

(51) Int. Cl.
*G06F 15/16*    (2006.01)
*H04L 29/06*    (2006.01)
*H04N 21/4363*    (2011.01)
*H04N 21/438*    (2011.01)
*H04N 21/61*    (2011.01)

(52) U.S. Cl.
CPC ............ *H04L 65/608* (2013.01); *H04N 21/438* (2013.01); *H04N 21/43637* (2013.01); *H04N 21/6131* (2013.01)

(58) Field of Classification Search
CPC .......... H04N 21/43637; H04N 21/438; H04N 21/6131; H04L 65/608; H04L 29/06
See application file for complete search history.

(56) References Cited

U.S. PATENT DOCUMENTS

| 7,039,943 | B1 | 5/2006 | Hasha | |
|---|---|---|---|---|
| 2009/0305633 | A1 | 12/2009 | Warsta | |
| 2010/0260296 | A1* | 10/2010 | Chorney | H04L 25/0262 375/357 |
| 2011/0185026 | A1 | 7/2011 | Kambhatla | |
| 2011/0276711 | A1 | 11/2011 | Gong et al. | |
| 2013/0014184 | A1* | 1/2013 | Mank | H04L 12/2809 725/80 |

FOREIGN PATENT DOCUMENTS

WO    2013/089793 A1    6/2013

OTHER PUBLICATIONS

International Search Report and Written Opinion received for PCT Patent Application No. PCT/US2011/065684, mailed on Sep. 24, 2012, 11 Pages.
International Preliminary Report on Patentability and Written Opinion received for PCT Patent Application No. PCT/US2011/065684, mailed on Jun. 26, 2014, 7 pages.

* cited by examiner

*Primary Examiner* — Benjamin M Thieu
(74) *Attorney, Agent, or Firm* — Ellis B. Ramirez; Prass LLP

(57) ABSTRACT

A method and system may include a source station to provide wireless multicast transmission to a plurality of destination stations according to a protocol adaptation layer multicast management protocol. The topology includes audio/video sources and sinks and intervening branch devices. Messages between sources and sink devices may be used for resource management such as device discovery and certification. If certification is shown, the disclosed transmission performs AV streaming directly to the least one sink device without the need for a displayport (DP) interface or a high definition multimedia interface (HDMI) or additional bridge devices/dongles that convert WiGig to some other interface supported by the monitor.

17 Claims, 6 Drawing Sheets

FIG. 4

| Octets | 1 | 1 | 1 | 1 |
|---|---|---|---|---|
| | #DP Connectors | #HDMI Connectors | #MWS Video Endpoints | #MWS Audio Endpoints |

402 — #DP Connectors
404 — #HDMI Connectors
410 — #MWS Video Endpoints
420 — #MWS Audio Endpoints

400

AUDIO/VIDEO STREAMING IN A TOPOLOGY OF DEVICES WITH NATIVE WIGIG SINK

BACKGROUND

1. Field of the Disclosed Embodiments

The present invention relates generally to devices that source and sink video and audio data and, more particularly, to streaming audio or video data to sink devices without the need for intermediate devices.

2. Introduction

The demand for increasing data transfer rates between devices is ever increasing, and in particular, wireless data transfer rates. To meet the demand for increasing wireless data transfer rates, a new high-speed wireless standard WiGig is under development. WiGig facilitates communication between wireless communications systems operating in the 60 GHz band for devices such as computing, entertainment, and communications devices, including, televisions, stereos, personal digital assistants (PDA), mobile telephones, media playing devices, gaming devices, personal computers, laptop computers, and any another suitable wireless communication device. For example, WiGig products may transfer data in a range of approximately 1 Gigabits per second (Gbps) to 6 Gbps, within a range of less than 10 meters, i.e., within a single room.

DETAILED DESCRIPTION OF THE DISCLOSED EMBODIMENTS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 4 is an illustration of possible fields that can be added to the AV capability response packet to include endpoint addressing rules in accordance to an embodiment;

Figure 1:
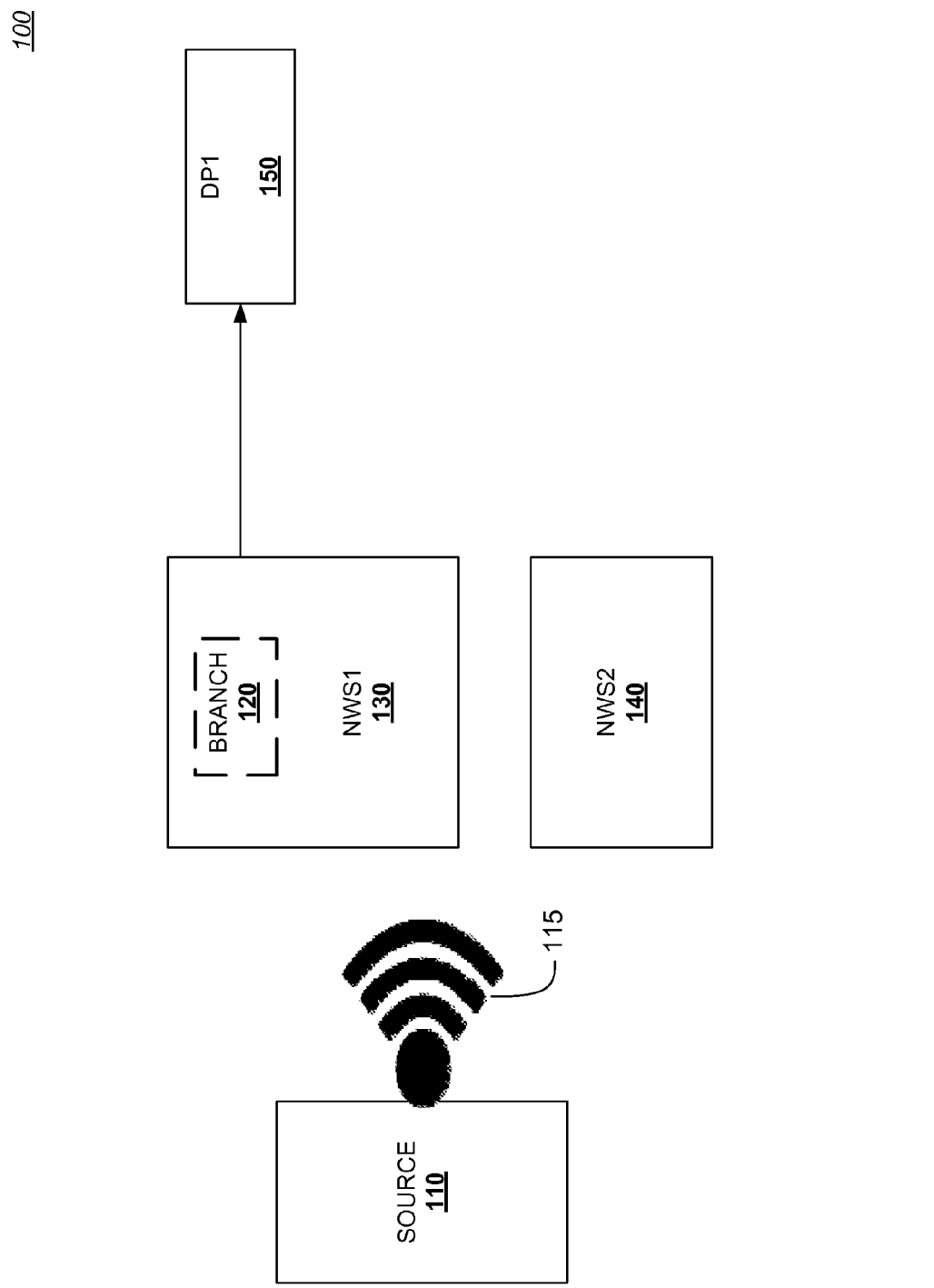
FIG. 1 illustrates a topology of devices to stream audio/video data in accordance to an embodiment.

Additional features and advantages of the disclosure will be set forth in the description which follows, and in part will be obvious from the description, or may be learned by practice of the disclosure. The features and advantages of the disclosure may be realized and obtained by means of the instruments and combinations particularly pointed out in the appended claims. These and other features of the present disclosure will become more fully apparent from the following description and appended claims, or may be learned by the practice of the disclosure as set forth herein.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Although embodiments of the invention are not limited in this regard, discussions utilizing terms such as, for example, "processing," "computing," "calculating," "determining," "applying," "receiving," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. For example, "a plurality of resistors" may include two or more resistors.

The term "Source device" as used herein refers to a device that is the source of Audio or video (AV) streams. Examples of source devices are personal computers (PCs), AV servers, Camcorders, a settop box (STB), a digital video recorder (DVR), a still or video camera, a game console, a cellphone or smartphone, a personal digital assistant (PDA), digital video disc DVD or blue-ray disc (BD) players and other devices.

The term "Sink devices" as used herein refers to devices that terminate an AV stream by rendering the content such as displaying. Examples of sink devices may be televisions, receivers, displays, monitors, speakers, printers, laptop or personal computers, cellphones or smartphones, personal digital assistants (PDAs), projectors, and other devices.

The term "Branch devices" as used herein refers to devices that take as input one or more AV streams from one or more upstream link and deliver one or more AV streams to one or more downstream links.

The term "DP sink device" or "HDMI Sink device" as used herein refers to Sink devices that use digital processing displayport (DP) interface or high definition multimedia interface (HDMI) to connect to other devices in a display topology.

The term "Native WiGig Sink (NWS)" device as used herein refers to sink devices or branch devices that use wireless gigabyte (WiGig) as the (wireless) interface to connect to other devices in a display topology. It is not precluded that such sinks support other wired or wireless interfaces in addition to the WiGig interface.

The term Display Topology (DT) as used herein refers to a topology of devices, to a set of AV devices including at least one Source device, at least one Sink device, and zero or more branch devices. A topology may have wired or wireless links between devices. Wireless links could be WiGig or other technologies.

The term "WiGig Display Extension" (WDE) as used herein refers to an industry standard that defines a framework for AV streaming over WiGig Physical (PHY) and medium access control (MAC) layers.

The term "WDE TX" as used herein refers to Transmit functionality in WDE, present in Source devices and in Branch devices that support WDE downstream.

The term "WDE RX" as used herein refers to Receive functionality in WDE, present in NWS devices and in Branch devices that support WDE upstream.

The term "MCCS" as used herein refers to a specification from VESA for Monitor Control and Command Set (MCCS).

FIG. 1 illustrates a topology of devices to stream audio/video data in accordance to an embodiment. Topology 100 may be a wireless network, a wireless local area network (WLAN), or a wireless personal area network (WPAN) that may operate according to Wireless Gigabit Alliance (WGA or WiGig) or other wireless standard. WiGig is designed to operate substantially in the 60 GHz band (or spectrum) and transmit (generally) compressed data from hundreds of megabits per second (Mbps) to several gigabits per second (Gbps). (The 60 GHz band may include transmissions within the range from about 56 GHz to about 66 GHz.) Although the invention is not limited in this respect, topology 100 may include a source (or source station) 110 and a plurality of destinations or sinks such as branch 120 which is managed by NWS1 130, NWS2 140, and DP1 150 which is a DP sink device. In topology 100, NWS1 130 is capable of supporting a downstream wired link (DP1) through its branch functionality.

An NWS device is a monitor that meets endpoint requirements, capability requirements, control and configuration requirements, format requirements, content protection requirements, and core WDE framework requirements. If the NWS device does not meet these requirements it is not an NWS device and direct steaming by the source will not be undertaken.

Endpoint Requirements:

1. NWSs shall feature at least one video endpoint or one audio endpoint i.e., they have the ability to present at least one instance of audio or video streams 2. They support video and/or audio formats as defined in the base specification for video or audio endpoints respectively. For example, if a NWS supports one or more video endpoints, it shall support both AVC and RAW streams and optionally support WSP stream(s).

3. When NWSs feature detachable audio endpoints, they shall support asynchronous notification of speaker plug or unplug Capability Requirements:

1. NWSs shall include an EDID, compliant to v1.4 or higher of VESA's E-EDID specification; this is to enable reporting audio and/or video capabilities of the monitor.

2. When only video or only audio endpoints are present, corresponding video or audio fields in the EDID shall be populated 3. Access to the EDID shall be possible either as a whole or based on block/offset 4. They shall also support AV Capability Response packet to enable discovery of its WDE RX capabilities, and to enable monitor type determination 5. It is possible for the monitor to change the EDID dynamically, at which point it shall generate an asynchronous EDID_CHANGED notification to the Source device through Native WiGig Passthrough Packet (defined in the framework section of this document).

a. Informative: Current OS implementations assume the EDID does not change dynamically. So monitor vendors should take this into consideration before making this change. Over time, especially with the device identification feature described below, this is expected to change.

6. In case the WiGig Sink supports more than one video endpoint, a separate EDID shall be supported for each such endpoint, and should be accessible through a zero-based Endpoint Index Control and Configuration Requirements:

1. WiGig Sinks shall support MCCS v2.2a (or higher) for control and configuration of the monitor a. Sink vendors determine the specific VCPs to be supported, noting that some OS vendors have their stated requirements for minimum VCP support 2. WiGig Sinks could optionally feature buffering and associated control to enable compensation for sink introduced processing delays 3. NWS devices shall optionally support a 16-byte GUID to enable device identification, which could be either be preprogrammed, or be settable from the Source in a write-once manner. If set from the Source, the GUID shall be persisted subsequently a. Presence of this 16-byte GUID is mandatory when the monitor supports more than one interface to the same AV function—through WDE and DisplayPort, for example b. The GUID is also mandatory when the monitor supports more than one function—such as audio and video, for example.

Format Requirements:

1. If video endpoint(s) are present, NWS devices shall support:

a. A minimum video resolution of 1280×720p b. RGB444 c. 24 bpp

All other color depths, colorimetry formats, and resolutions are optional

2. If Stereoscopic 3D video is supported, NWS devices shall support the following S3D formats:

a) Frame Packing as defined in HDMI 1.4a or Stacked Top, Bottom as defined in DP1.2.

b) frame sequential, as defined in DP1.2, and c) Side-by-Side and Top-and-Bottom, as defined in HDMI 1.4a. No other formats are supported.

3. If audio endpoint(s) are supported by an NWS Sink, it shall support LPCM for all sampling rates up to and including HBR audio. Compressed formats are optional Content Protection Requirements:

1. If premium content is desired, NWS devices shall support HDCP 2.0 mapping for WiGig.

Core WDE Framework Requirements:

1. Meet WDE RX requirements, as expected for all WDE RX devices

Figure 2:
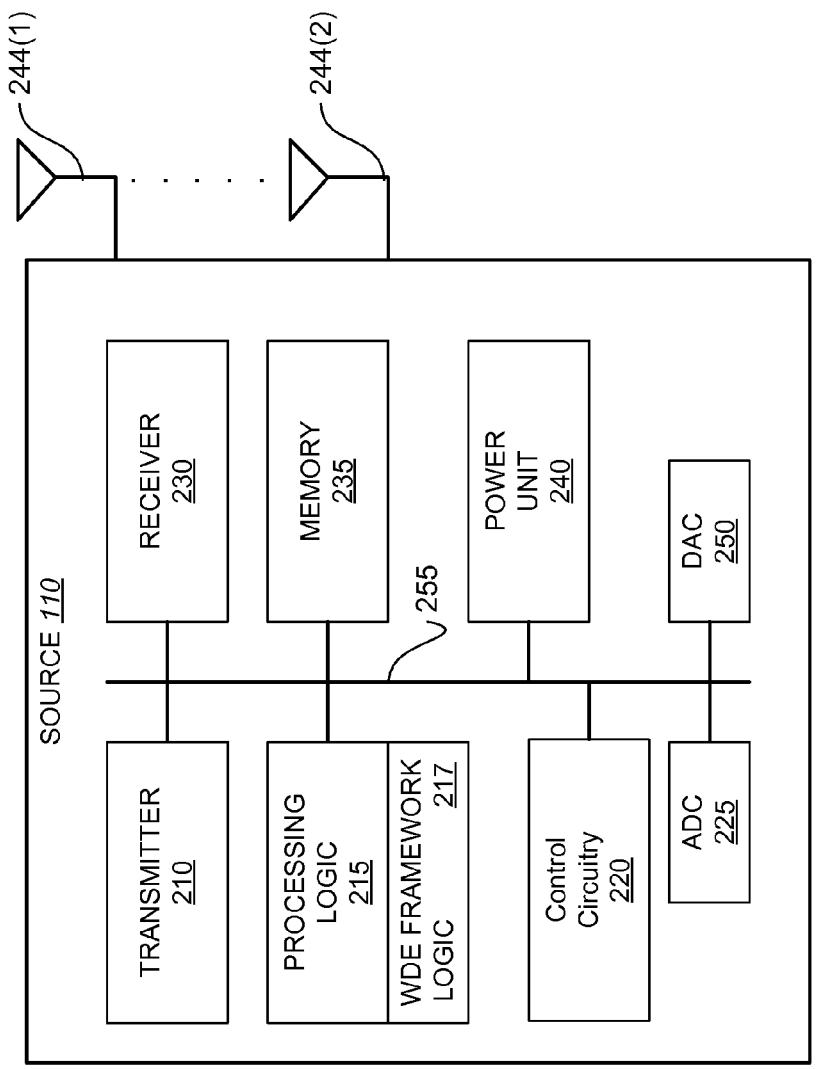
FIG. 2 is illustrating a system-level overview of a source device capable of streaming audio/video data in a topology of devices in accordance to an embodiment.

FIG. 2 is illustrating a system-level overview of a source device 110 capable of streaming audio/video data in a topology of devices in accordance to an embodiment.

The source device 110 includes a transmitter 210, a receiver 230, processing logic 215, an analog-to-digital converter (ADC) 225, a digital-to-analog converter (DAC) 250, a memory 235, control circuitry 220, a power unit 240, antenna(s) 244, and a bus 126. NWS devices may also include a user interface to facilitate user interaction with the device. The source device 110 is configured to transmit to, and receive signals from, the sink devices such as NWS1 130. Specifically, the DAC 250 converts signals from digital to analog such that the transmitter 210 transmits wireless signals via the antenna(s) 244. The receiver 230 receives wireless signals via the antenna(s) 244 and converts the signals from analog to digital via the ADC 225. The wireless signals comprise audio, video, data, control information, or any combination thereof.

The processing logic 215 includes one or more processors and the memory 235 is accessible to the processing logic 215. The memory 235 includes read-only memory (ROM), random access memory (RAM), flash memory, a hard disk, or any combination thereof. Additionally, the memory 235 stores one or more applications configured to transmit and/or receive the wireless signals. The processing logic includes WDE framework logic 217 having instructions to perform device discovery and certification, and direct streaming of AV data to a device such as a Native WiGig Sink (NWS) device. The applications stored in the memory 235 may include software instructions, hardware, or any combination thereof. Additionally, the control circuitry 220 provides control signals to the components of source device 110. The source device 110 may include a single antenna 244(1) or a plurality of antennas 244(2). The source device 110 may be implemented in any number of ways, including but not limited to, a laptop computer, a desktop computer, a monitor, a set top box, a media player, and the like.

Figure 3:
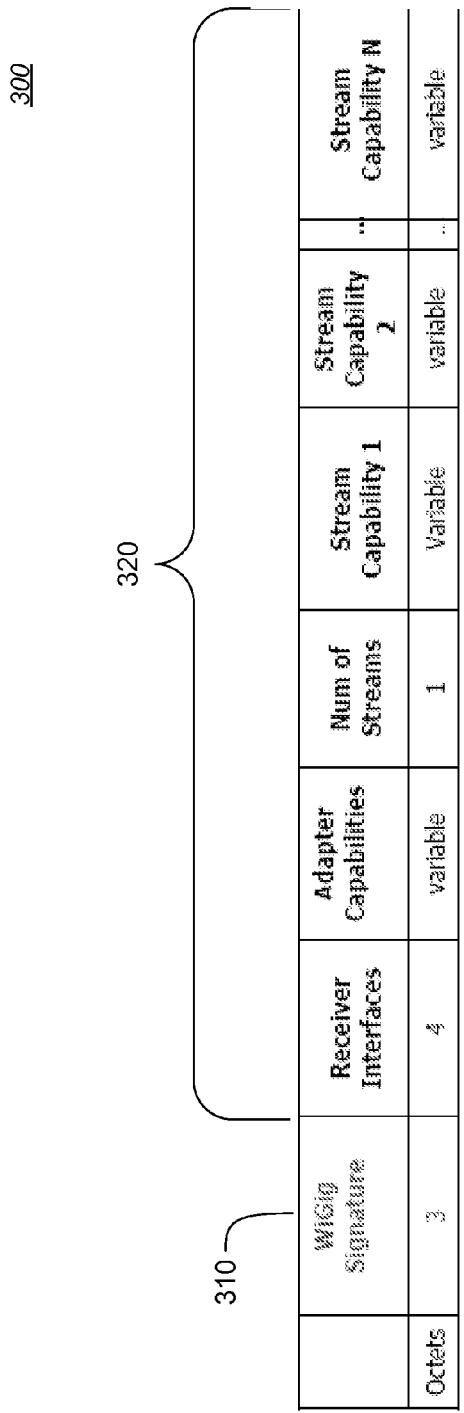
FIG. 3 is an illustration of an AV capability response packet in accordance to an embodiment.

FIG. 3 is an illustration of an AV capability response packet in accordance to an embodiment. The AV Capability Response packet 300 is a message sent to a source device in response to a discovery packet. If the WDE RX is a NWS device such as NWS2 140, it shall insert an Institute of Electrical and Electronics Engineers (IEEE) Organizationally Unique Identifier (OUI) signature for WiGig Alliance in the Capability Response packet 300. Only certified NWS devices have the permission to use this signature in the Capability Response packet. The WiGig signature field (IEEE OUI) identifies the device as being certified to accept direct transmission from a source and certified to meet endpoint requirements, capability requirements, control and configuration requirements, format requirements, content protection requirements, and core WDE framework requirements. Reception of WiGig signature 310 triggers engagement by WDE TX on the rest of the NWS specific procedures with the WDE RX—and not otherwise. Fields 320 are for information relating to Receiver Interfaces, Adapter Capabilities, Num of Streams, and Stream Capability 1 to Stream Capability N.

FIG. 4 is an illustration of possible fields that can be added to the AV capability response packet to include endpoint addressing rules in accordance to an embodiment. The Receiver Interfaces field of the AV Capability Response packet 300 is extended to additional fields 400 such as DP Connectors 402, HDMI Connectors 404, NWS Video Endpoints 410, NWS Audio Endpoints 420.

The DP Connectors fields 402 and HDMI Connectors field 404 shall be greater than or equal to zero. For NWS devices featuring these downstream connectors, WDE TX shall use DP and HDMI Passthrough Packets that form part or are already defined in the WDE requirement for AV streaming WDE TX and WDE RX implement the following endpoint addressing rules for NWS devices:

The NWS Video Endpoints field 410 and NWS Audio Endpoints field 420 shall be greater than or equal to zero, but at least one of these two fields shall be greater than zero.

(a) A video endpoint cannot have more than one audio endpoints associated with it (b) Association between audio and video endpoints cannot be made programmatically.

(c) Endpoint Index values of audio endpoints follow those of the video endpoints.

(d) When only one video endpoint and one audio endpoint exist, they are addressed with Endpoint. Index values of 0 and 1 respectively.

(e) When N (>1) video endpoints and M (>1) audio endpoints exist:

Case N=M.
(i) All video endpoints also have audio endpoints.
(ii) Audio endpoint with Endpoint Index i+N corresponds to the video endpoint of Endpoint Index i, where 0<=i<N Case N>M.
(i) Video endpoints 0 . . . (M−1) shall feature associated audio endpoints. Video endpoints M . . . (N−1) shall not feature audio.
(ii) (ii) Audio endpoint with Endpoint Index i+N corresponds to the video endpoint of Endpoint Index i, where 0<=i<M.

Case N<M.
(i) All video endpoints also have audio endpoints, and these shall be accessible through Endpoint Index values 0 . . . (N−1). Only audio endpoints with Index values N . . . (M−1) shall be targeted for audio
(ii) Audio endpoint with Endpoint Index i+N corresponds to the video endpoint of Endpoint Index i, where 0<=i<N.

Figure 5:
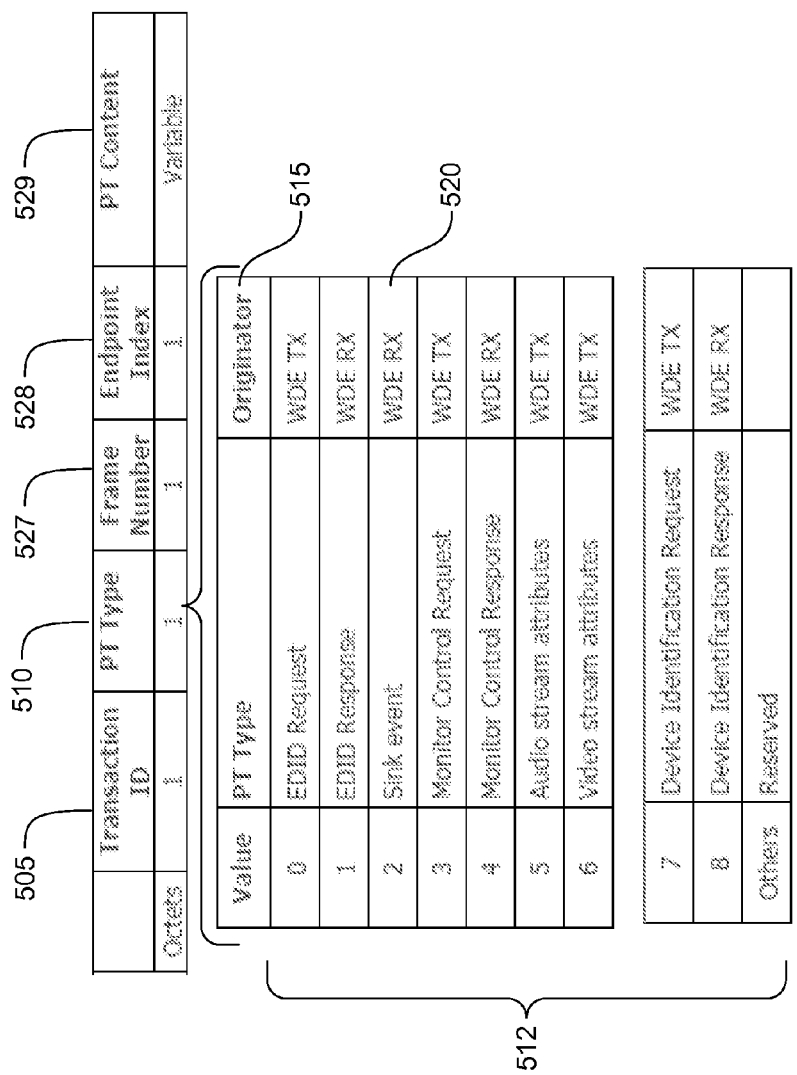
FIG. 5 is an illustration of the structure of a passthrough packet and associated protocol in accordance to an embodiment.

FIG. 5 is an illustration of the structure of a passthrough packet and associated protocol 500 in accordance to an embodiment. A new class of Passthrough Packets is defined targeting NWS devices as follows: <add pass=through packet number>. The NWS Passthrough Packet is structured as follows: Transaction ID field 505, PT Type field 510, and fields pertaining to Frame Number 527, Endpoint Index 528, and PT Content 529. The PT type field 510 has attributes 512 and the originator 515 and the PTtype that belong Transaction ID field 505 and Frame Number field 527 are used as per current definition in WDE. Transaction ID field 505 is present in every NWS Passthrough Packet, but Frame Number field 527 is present only in some flavors of this Packet type as defined below.

Endpoint Index field 528 identifies the audio or video endpoint to which the stream is directed. Content in the PT Content field 529 varies as per PT Type, as defined later in this section. PT Type field 510 for NWS devices shall be one of the values 512 defined in the illustrated table which identifies an originator 515. For example, a sink event where the originator is WDE RX would have a value of two (2) as shown in the illustrated table (see label 520).

Protocol rules for NWS Passthrough Packet are as follows: (a) When this packet is initiated by WDE TX, the WDE RX responds back with a SUCCESS after a quick check on validity of the parameters, where present; (b) For packets sent to the WDE TX, no response is expected back by the WDE RX; and (c) The WDE RX could optionally repeat transmission of the packet (importantly, with the same transaction number) in order to guard against potential loss of the packet in the wireless medium.

Figure 6:
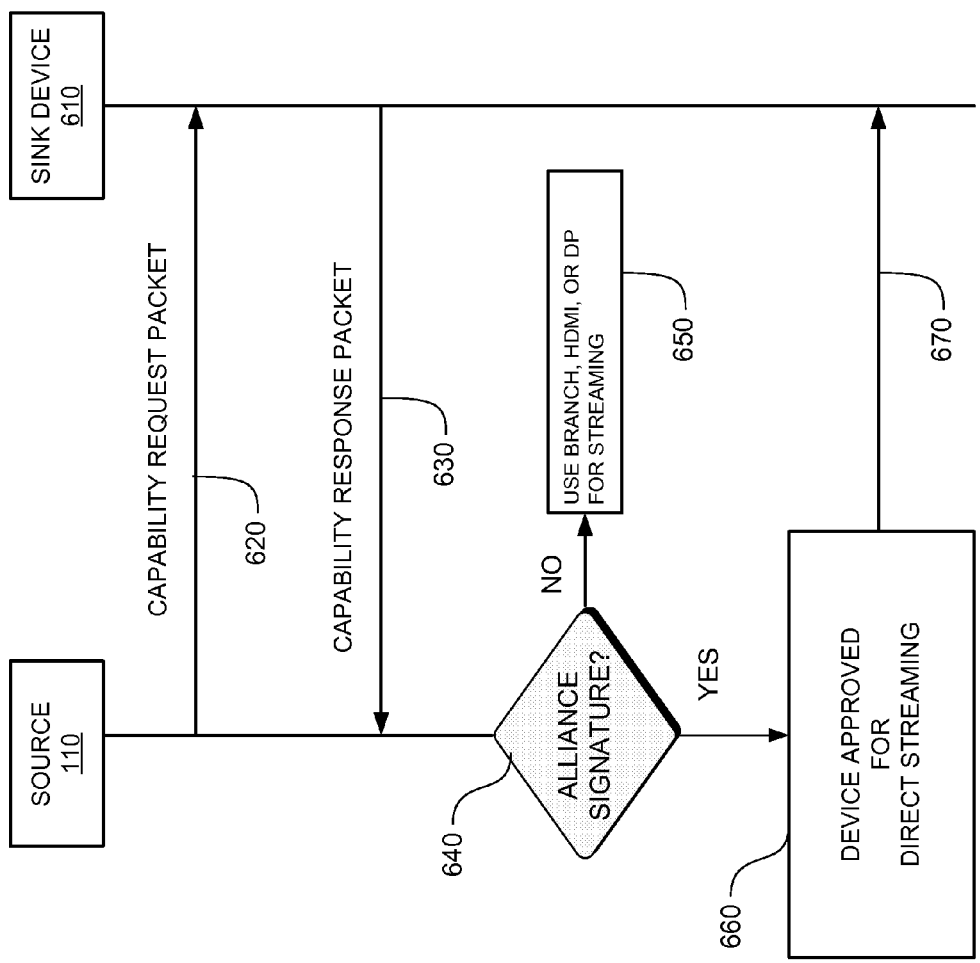
FIG. 6 is a conceptual illustration of device discovery and certification in a topology of devices in accordance to an embodiment.

FIG. 6 is a conceptual illustration of device discovery and certification in a topology of devices in accordance to an embodiment. When notified of a new device in range such by receiving an inquiry scan from the device, the WDE TX at the source 110 shall send a Capability Request packet 620 and await a response. The WDE RX at a sink device returns a Capability Response packet 630. If the WDE RX is a NWS device, it shall insert the IEEE OUI signature for WiGig Alliance in the Capability Response packet it responds with. The source 110 device looks for the WiGig signature at action 640 and if not found ("NO") in the capability response packet 630, see FIG. 3 and FIG. 4 for a definition of the fields, then streaming is conducted through an a branch, DP, or HDMI interface 650. If the WiGig signature is found then the device is a Native WiGig sink (NWS) and the source approves the sink device 610 for direct streaming 660. Communication 670 between the WDE TX at source 110 and the WDE RX is conducted using NWS specific procedures.

Concerning audio and video format/timing discovery: WDE TX at source 110 uses an NWS Passthrough Packet with a PT Type of EDID Request to obtain the EDID for a given video endpoint in an NWS device. PT Content and Frame Number fields are not present when PT Type is EDID Request. WDE RX at sink device 630 responds with the complete EDID for the Endpoint Index specified in the EDID Request. It populates the Transaction ID and Endpoint Index values with the values used in the Payload for EDID Request PT Type for which this packet is the response. It does changes the PT Type field to EDID Response. Frame Number field is not present for EDID Response. PT Content for EDID Response is as follows:

| PT Content for EDID Response | | |
|---|---|---|
| | EDID Size | EDID |
| Octets | 2 | Variable |

Value of the EDID Size field indicates the number of octets that follow.

Concerning connection setup and resource reservation. WDE TX uses an AV Connection Setup Packet to start a new audio and/or video stream. It populates Stream ID, Endpoint Index, CPB Size, and Jitter Bound parameters as per the WDE specification. It populates A/V Config parameter as per the WDE specification, but uses new values for A/V Type and A/V Link Layer as shown in bold in the following table:

| A/V Type and A/V Link Layer value combinations for NWS Devices | | |
|---|---|---|
| A/V Type | A/V Link Layer | A/V Format |
| 0 | 0 | DisplayPort Video Information |
| 1 | 0 | DisplayPort Video Information |
| 0 | 1 | HDMI Video Information |
| 1 | 1 | HDMI Video Information |
| 0 | 2 | NWS Video Information |
| 1 | 2 | NWS Video Information |
| Others | Others | Reserved |

WDE TX must structure the content of A/V Format field in the A/V Configuration parameter as per the interpretation of fields in the table above. NWS Video and Audio Information fields are set in the same manner as DisplayPort Video and Audio Information fields respectively.

Concerning display/monitor Configuration: WDE TX uses an NWS Passthrough Packet with a PT Type of Monitor Control Request to configure the monitor at the specified Endpoint Index in the NWS device. Frame Number field is not present for this PT Type. PT Content is set as follows:

| Structure for PT Content in Monitor Control Request | | | | |
|---|---|---|---|---|
| | Size | Host Request | VCP OPCODE | Parameters |
| Octets | 1 | 1 | 1 | Variable |

The Size field indicates the total size of the Monitor Control Request packet including one octet for itself. The Host Request field is an encoding of the Generalized Host Requests as defined in table MCCS protocol: the first item in the list (GetSupportedControls) is coded as 0, and the rest follow in the order they are defined in the MCCS protocol. Where applicable, the VCP Opcode field specifies the VCP on which the generalized host request is to be performed. And where applicable, the Parameters field lists the parameters to the VCP Opcode with the High Bytes (where applicable, as defined in the MCCS protocol) are transmitted immediately after the VCP Opcode and the Low Bytes (where applicable, as defined in the MCCS protocol) are transmitted next. WDE RX responds with an NWS Passthrough Packet with a PT Type of Monitor Control Response packet. This packet does not contain Endpoint Index and Frame Number fields in them. The Transaction ID in this response packet is set to the same value as the request packet to which this is the response. PT Content field is structured as follows:

| Structure for PT Content in Monitor Control Response | | |
|---|---|---|
| | Size | Data |
| Octets | 1 | Variable |

The Size field indicates the total size of the Monitor Control Response packet including one octet for itself. WDE TX uses this parameter to determine number of bytes in the Data field. Structure of the Data field is dependent on the Host Request and VCP Opcode fields in the Monitor Control Request, as defined in the MCCS protocol.

Concerning Sink Events: WDE RX uses an NWS Passthrough Packet with a PT Type of Sink Event to asynchronously notify WDE TX that a sink event has occurred. It sets the Transaction ID as described in the WDE specification. Frame Number is not present in this packet. Endpoint number of the panel originating this sink event is indicated in the Endpoint Index field. The specific sink event that occurred is indicated in the PT Content, which is structured as follows:

| Structure of PT Content in Sink Event packet | | | |
|---|---|---|---|
| | Event | Size of Supplementary Data | Supplementary Data |
| Octets | 1 | 2 | Variable |

The Event field is a bitmap indicating which event(s) occurred on the sink; it is structured as follows:

| Event bit-field definition | | | | |
|---|---|---|---|---|
| | Reserved | Orientation Change | Speaker Plug Status Change | Touch |
| Bits | 13 | 1 | 1 | 1 |

A bit is set if the corresponding event occurred in that panel in the NWS device. Corresponding bits are set when multiple events are indicated in the same packet.

The Size of Supplementary Data field in PT Content contains the number of bytes in the Supplementary Data field that follows. Supplementary Data contains additional information about the event that occurred.

Concerning Format Changes WDE TX uses an NWS Passthrough Packet with a PT Type of Audio Stream Attributes or Video Stream Attributes to notify WDE RX that there has been a change in the current Audio or Video stream respectively. It sets the Transaction ID as described in the WDE specification. Frame Number is present in this packet and is used to indicate the frame number in the audio or video stream from which the new audio or video format takes effect. Endpoint number of the panel originating this sink event is indicated in the Endpoint Index field. Based on PT Type, structure of PT Content field for these packet types either contains the NWS Audio Information or NWS Video Information (as described in the AV Connection Setup section above) reflecting the updated format information. WDE RX in NWS devices shall implement the Synchronized Control feature of the WDE specification.

Concerning Premium Content: NWS devices shall implement HDCP2 RX (and therefore be compliant to HDCP Licensing terms) in order to receive premium content. If the device containing WDE RX contains downstream wired or wireless interfaces in addition to the NWS, the decrypted content must be re-encrypted before transmission downstream as per HDCP Licensing terms. Parameters such as Stereoscopic 3D, Wide Gamut, Touch are defined at the source, defined by the manufacturers of the sink device, or defined by instructions within the streaming data.

Concerning Device Identification Request and Response. WDE TX uses an NWS Passthrough Packet with a PT Type of Device Identification Request to request the GUID in the NWS device. It sets the Transaction ID as described in the WDE specification. Frame Number, Endpoint Index, and PT Content fields are not present in this packet. WDE RX uses an NWS Passthrough Packet with a PT Type of Device Identification Response to respond to the Device Identification Request packet. It sets the Transaction ID to the value in the corresponding request packet. Frame Number and Endpoint Index fields are not present in this packet. PT Content is present and is set as per the following structure:

| Structure of the PT Content field for Device Identification Response packet | |
|---|---|
| | GUID |
| OCTETS | 16 |

The GUID field contains the value of the 16 byte GUID in the NWS device.

If this value is non-zero, it is assumed to be initialized by the device manufacturer. If it is zero, the WDE TX follows up with an NWS Passthrough Packet with a PT Type of Set Device Identification to program a GUID into the device. Transaction ID, Frame Number, Endpoint Index, and PT Content fields are structured similar to the Device Identification Response packet described above—with the difference that PT Content will now have a valid (non zero) and unique GUID from the WDE TX. On reception, the NWS device shall set this value into its write once register, and this value shall be valid in the device henceforth. And it shall fail further attempts to write to this GUID.

Embodiments within the scope of the present disclosure may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that performs particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Embodiments of the present invention provide a non-volatile computer readable medium encoded with computer executable instructions, which when accessed, cause a machine to allow directly streaming of audio or video data to a native WiGig sink device without the need of HDMI or DPI interfaces or additional bridge devices/dongles that convert WiGig to some other interface supported by the monitor.

Although the above description may contain specific details, they should not be construed as limiting the claims in any way. Other configurations of the described embodiments of the disclosure are part of the scope of this disclosure. For example, the principles of the disclosure may be applied to each individual user where each user may individually deploy such a system. This enables each user to utilize the benefits of the disclosure even if any one of the large number of possible applications do not need the functionality described herein. In other words, there may be multiple instances of the components each processing the content in various possible ways. It does not necessarily need to be one system used by all end users. Accordingly, the appended claims and their legal equivalents should only define the disclosure, rather than any specific examples given.

I claim:

1. A method comprising:
   establishment of streaming with a device in a topology of devices, including devices that source and sink video and/or audio data, if a field within a message contains a unique identifier certifying the device as capable of directly sinking a stream from a source;
   wherein the message is a capability response packet generated by the device;
   wherein the capability response packet is extended to include video endpoints, audio endpoints, and WiGig signature fields;
   wherein the device is at least one of audio device, video device, audio video device, a device with multiple audio video endpoints, a device with unequal number of audio and video endpoints, or a device with one or more downstream high definition multimedia interface (HDMI) or displayport (DP) connectors.

2. The method according to claim 1, wherein source Devices generate and Sink Devices interpret endpoint addresses based on Endpoint Addressing Rules to ensure consistent endpoint selection from a group of video endpoints, and audio endpoints.

3. The method according to claim 2, wherein WiGig Display Extension (WDE) packet types are extended to include a new class of Passthrough Packet that enables a) the Source Devices to obtain Extended Display Identification Data (EDID), control the monitor, set audio and video stream attributes, and request device identification, and b) the Sink Devices to indicate sink events.

4. The method of claim 1, further comprising assigning a globally unique identifier to each device in the topology of devices.

5. The method according to claim 4, wherein the device is capable of directly streaming from a source at least one of audio only stream, video only stream, co-existing audio only and video only streams.

6. The method according to claim 1, wherein a certification indicates that the device meets endpoint requirements, capability requirements, content and configuration requirements, format requirements, content protection requirements, and core framework requirements.

7. The method according to claim 6, wherein the device is a native WiGig sink (NWS) device.

8. A non-transitory computer readable medium storing instructions for execution by a processor in a device in a topology of devices including a source and sink of video or audio data to:
   establishment of streaming with the device in the topology of devices if a field within a message from the device contains a unique identifier certifying the device as capable of directly streaming;
   wherein the message is a capability response packet generated by the device;
   wherein the capability response packet is extended to include endpoint addressing rules selected from the group consisting of video endpoints, and audio endpoints;
   wherein the device is at least one of audio device, video device, audio video device, a device with multiple audio video endpoints, a device with unequal number of audio and video endpoints, or a device with one or more downstream high definition multimedia interface (HDMI) or displayport (DP) connectors.

9. The non-transitory computer readable medium of claim 8, further comprising assigning a globally unique identifier to each device in the topology of devices.

10. The non-transitory computer readable medium according to claim 9, wherein the device is capable of directly streaming from a source at least one of audio only stream, video only stream, co-existing audio only and video only streams.

11. The non-transitory computer readable medium according to claim 9, wherein a certification indicates that the device meets endpoint requirements, capability requirements, content and configuration requirements, format requirements, content protection requirements, and core framework requirements.

12. The non-transitory computer readable medium according to claim 11, wherein the device is a native WiGig sink (NWS) device.

13. A source device in a topology of devices comprising:
   a processing unit;
   a memory coupled to the processing unit;
   a transmitter, coupled to the processing unit, to stream audio or video data to at least one sink device;
   a computer-usable data carrier storing instructions, the instructions when executed by the processing unit causes the transmitter to:
   establishment of streaming with a sink device in the topology of devices if a field within a message contains a unique identifier certifying the sink device as capable of directly streaming from a source;
   wherein the message is a capability response packet generated by the sink device;
   wherein the capability response packet is extended to include endpoint addressing rules selected from the group consisting of video endpoints, and audio endpoints;
   wherein the sink device is at least one of audio device, video device, audio video device, a device with multiple audio video endpoints, a device with unequal number of audio and video endpoints, or a device with one or more downstream high definition multimedia interface (HDMI) or displayport (DP) connectors.

14. The source device of claim 13, further comprising assigning a globally unique identifier to each sink device in the topology of devices.

15. The source device according to claim 14, wherein the sink device is capable of directly streaming from a source at least one of audio only stream, video only stream, co-existing audio only and video only streams.

16. The source device according to claim 13, wherein a certification indicates that the sink device meets endpoint requirements, capability requirements, content and configuration requirements, format requirements, content protection requirements, and core framework requirements.

17. The source device according to claim 16, wherein the sink device is a native WiGig sink (NWS) device.

* * * * *